United States Patent Office 2,926,537
Patented Mar. 1, 1960

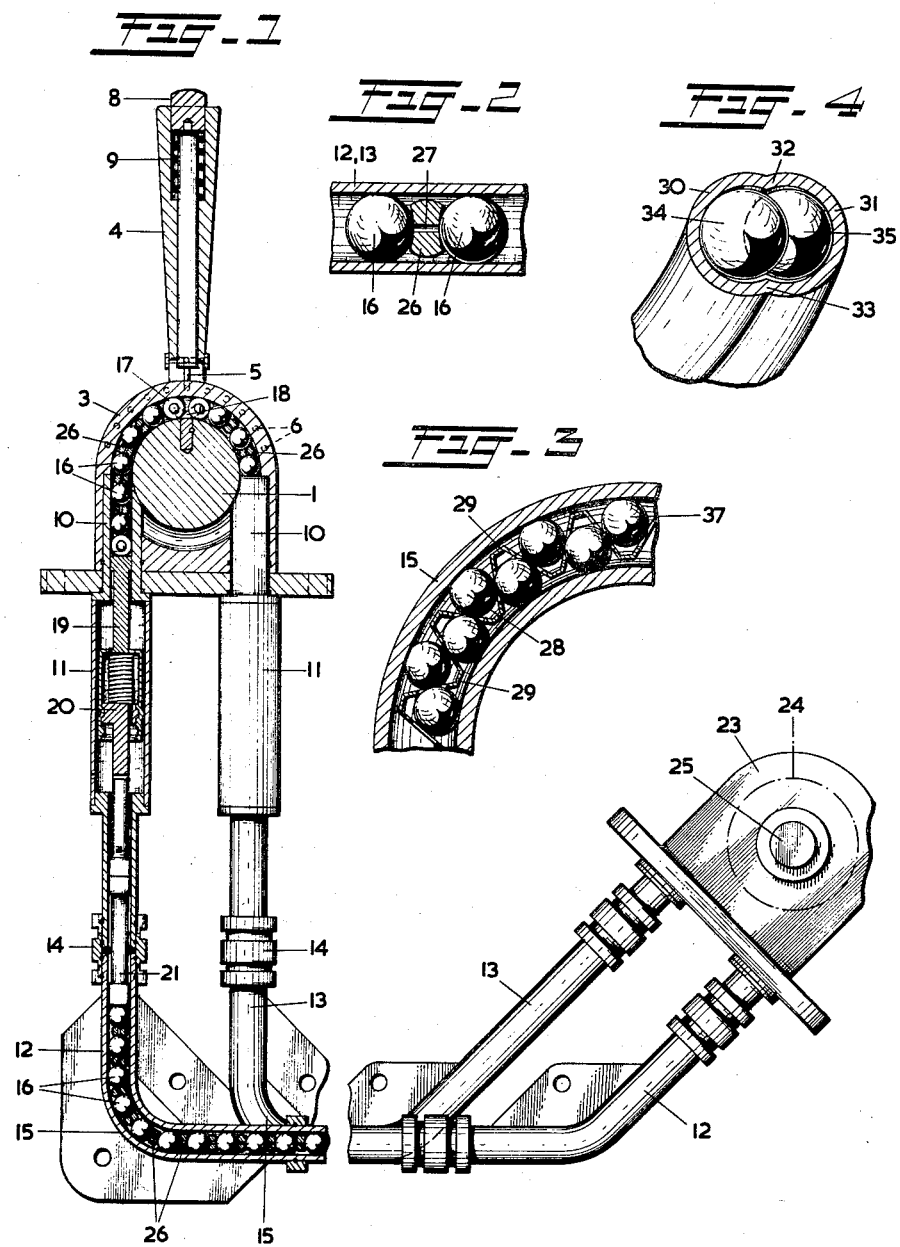

2,926,537
DEVICES FOR THE TRANSMISSION OF MOVEMENTS

Marius Cornelis Pieterse, Voorschoten, Netherlands

Original application September 13, 1954, Serial No. 455,648, now Patent No. 2,869,377, dated January 20, 1959. Divided and this application January 16, 1959, Serial No. 787,239

6 Claims. (Cl. 74—216.3)

This invention relates to a device for the transmission of movement, comprising a stationary guide tube having a series of pushing members fitting movably in said guide tube, said tube having a curved section comprising circular rolling bodies, either balls or rollers.

It is an object of this invention to reduce friction during the transmission of movement in such a device to a minimum.

It is a further object of this invention to obtain a device of the above indicated kind, which operates reliably and which gives the least rise to inaccuracies owing to clearances during the transmission of movement.

It is a further object of this invention to obtain a device of the above given kind, which is of simple structure and with parts which are easy to manufacture.

This invention will now be described on the basis of the accompanying drawings, which give several possible embodiments of devices according to the present invention.

Figure 1 shows in side view and partly in section a device according to a preferred embodiment of this invention for the remote control of a member such as a valve for a hydraulic system, for instance for varying the pitch of the propeller blades of a vessel.

Figure 2 shows on a larger scale part of the device of Fig. 1 in section.

Figure 3 shows a part of a curved section of a guide tube for use in a device such as given in Figure 1, but with pushing members in an alternative embodiment, in a section through the plane of curvature of the guide tube.

Figure 4 shows a section perpendicular to the plane of curvature and partly a view of a curved section of a guide tube with pushing members in a further embodiment of the invention.

Referring particularly to Fig. 1 the device shown has a transmitter, comprising a flat disc 1, rotatable about a central axis in a casing 3, of which the inner wall surrounds and embraces the periphery of the disc 1 with some clearance concentrically therewith. An operating handle 4 is secured to said disc 1 and straddles casing 3 in order to be secured to the central axis shaft or trunnions of disc 1. Handle 4 is thus able to rotate the disc 1 in both directions about its axis.

Handle 4 is automatically fixed in the neutral position shown in the drawing and in a number of other positions by a pawl 5, able to engage circular detents 6 in one of the side walls of casing 3. By pushing button 8 in handle 4 downwards against the action of spring 9 it is possible to move pawl 5 from the detent 6 to allow movement of handle 4.

Two tubular joints 10 are arranged parallel to one another tangential to the annular space between disc 1 and the inner wall of casing 3. Said joints constitute the connection with two tubes 11, the other ends of which are connected to guide tubes 12 and 13, leading to the remote receiver 23 and constituting together with casing 3, receiver 23 and tubes 11 a closed circuit with pushing members in the tube for the transmission of movement. Couplings 14 connect the separate parts of the guide tubes and said tubes may have a number of curves or bends such as 15.

In the upper half of the annular space between disc 1 and casing 3 and in the curved parts 15 of the system circular rolling bodies such as balls 16 are arranged so that they fit movably therein. The disc 1 carries two rollers 17 in brackets 18, said rollers being freely rotatable and being arranged symmetrically with respect to a line through handle 4 and the center of disc 1. The pushing members 16 in the annular space between disc 1 and casing 3 could be cylindrical rollers, and in the curves 15 of the guide tubes 12 and 13 could be balls. The tubes preferably have a circular cross section.

In the joints 10 the rollers 16 abut against a pushing rod 19, guided for axial movement in the tubes 11 and comprising in each tube an adjusting device 20 for automatically compensating clearance in the system. As this compensating device does not constitute part of the present invention and as such devices are known per se it will not be described in detail here. Rod 19 is in pushing contact with a rod 21 and said rod 21 abuts the first of a set of balls 16 in the curve 15.

The last ball in each set preferably abuts a rod which may be identical to rod 21 engaging the first ball. Additional straight and curved tube sections, couplings, sets of balls or rollers, and rods are provided as required to connect the transmitter to the receiver. The receiver may be substantially identical to the transmitter and may have a circular disc 24 such as disc 1 of the transmitter, said disc 24 being connected through shaft 25 to the member to be controlled, for instance to the movable part of a valve of a hydraulic system. Of course it is not possible to use pushing rods such as 21 in any parts of the guide tubes which are considerably curved such as curves 15 shown in Fig. 1, and this is true both for 90° curves and for curves of a different angle. All the curves as well as the receiver 23 are filled with balls or rollers such as the balls 16 as shown in the drawing.

The receiver 23 as well as the transmitter could easily be embodied in a different manner, for instance so that the guide tubes 12 and 13 at the transmitter and/or the receiver end are a greater distance apart and are operated by or operate upon the opposite ends of a lever journalled at its center in the stationary structure. The balls and rollers 16 are separated by separating members 26, shown on a larger scale in Fig. 2. Said separating members are constituted by discs with a thickness in the axial direction of the tubes 12, 13 smaller than the diameter of the balls or rollers 16. Said separating members 26 have a central bore 27 from one side to the other. The members 26 do not have flat sides, but the sides are concave as shown in Fig. 2. Thus the members 26 are centered by adjacent balls or rollers so that they will never contact the wall of the guide tube. The concave surfaces could be cylindrical in the case of rollers and spherical in the case of balls. They are made of a material giving low friction of the balls or rollers along them. The balls or rollers could be made of steel, as well as the guide tubes, and the discs 26 could be made of bronze or other material being a good bearing material for steel and nevertheless having a good resistance against pressure.

During the transmission of movement the balls or rollers 16 in the curves are urged against the outer side of the inner wall of the particular guide tube and thus the balls or rollers tend to roll around their point of contact in the tube. Should the balls or rollers contact one another immediately they would cause serious friction and erosion at their points of contact. By using separating members such as 26 of a different kind of material it is possible to prevent this and to lessen the friction considerably.

In practice the system is entirely fitted with a lubricant such as oil. This oil will also fill the bores 27 in members 26 and will thus further prevent wear and friction between the balls and the members 26. It is remarked that in Figures 1 and 2 the members 16 are shown as balls and that the tubular joint 10 is cylindrical so that it could not take up rollers fitting therein, but only balls. As stated before, however, rollers could as well be used, particularly in the receiver and transmitter.

Figure 3 shows a bend 15 filled with a number of balls 28 all of substantially the same diameter which is substantially smaller than the inner dimension of the guide tube. In view thereof the balls 28 tend to take positions alternately in contact with the inner and with the outer side of the curve. The same could be done with a guide tube with other than circular cross section and with rollers instead of the balls 28. Although the balls in such an embodiment are pushed with a rather considerable force against the wall of the guide tube in the bends 15 this does not matter very much in such an embodiment because there is almost perfect rolling, the only sliding action being possibly caused by the fact that the inner curve is somewhat shorter than the outer curve. This could be prevented entirely by making the diameters of the balls on the outside somewhat greater than the diameters of the balls on the inside of the curve. It even is not disadvantageous in such an embodiment if the balls should not all have their centers in the plane containing the axis of the bend 15 but instead in a curved surface perpendicular to the plane of the drawing, so that they do not contact the inner and outer side of the curve but contact points on opposite sides of the plane of the axis of the curve. This even would have the advantage that the balls all have to travel the same distance during the transmission of movement, so that perfect rolling is possible. Figure 3 shows a cage 29, of which the main purpose to make sure that during filling of the curve 15 with balls said balls indeed lie alternately on one and the other side of the axis of the guide tube. If no such cage should be present and if the balls were filled into the tube without more it could become possible for instance that two neighbouring balls contact the same side of the tube and this would spoil the effect of obtaining almost pure rolling and no sliding. The cage 29 could be made of a thin strip of metal with circular apertures for allowing the balls to contact one another. The apertures indicated have a diameter which is somewhat smaller than the diameter of the balls. During filling the cage is pushed into the tube, the balls being inserted in the spaces to both sides of the zig-zag cage just above the end of the tube, from which end the cage is pushed into the tube.

Figure 4 shows part of a bend or curve consisting of a tube having two circular parts 30 and 31 joining one another in the central part at 32 and 33. The tube receives balls 34 and 35 all of the same diameter alternately on one and on the other side, viz. alternately in part 30 and in part 31. The internal distance between the joints 32 and 33 is somewhat smaller than the diameter of the balls 34 and 35. This ensures that it is never possible for a ball to move from part 30 to part 31 or reverse. This guarantees that all the balls always have the correct mutual position.

What I claim is:

1. A device for the transmission of movement, comprising a stationary guide tube having a series of pushing members fitting movably in said guide tube, said tube having a curved section, the pushing members in said curved section comprising circular rolling bodies having substantially the same diameter as the inner diameter or corresponding dimension of the tube, a separating member being arranged between any two adjacent rolling bodies, said member being disc-shaped with a thickness in the axial direction of the tube, smaller than the diameter of the rolling bodies, said separating member having a concave curved surface at both sides, in which concavity the adjacent rolling bodies make contact therewith, a driving member for applying a force along the axis of said tube to the first of the pushing members of said series, and a driven member arranged to be moved along the axis of said tube by the last pushing member of said series, said force being transmitted from any rolling body to the next adjacent rolling body through the separating member between them, said force thus establishing rolling contact between the rolling bodies and the outer part of the curve of said section.

2. A device for the transmission of movement, comprising a stationary guide tube having a series of pushing members fitting movably in said guide tube, said tube having a curved section, the pushing members in said curved section comprising circular rolling bodies having substantially the same diameter as the inner diameter or corresponding dimension of the tube, a separating member being arranged between any two adjacent rolling bodies, said member being disc-shaped with a thickness in the axial direction of the tube, smaller than the diameter of the rolling bodies, said separating member having a concave curved surface at both sides, in which concavity the adjacent rolling bodies make contact therewith, said separating members having an outer diameter or size smaller than the inner radial dimension of said guide tube such that in operation they do not contact the wall of the guide tube and are centered by both oppositely adjacent rolling bodies, a driving member for applying a force along the axis of said tube to the first of the pushing members of said series, and a driven member arranged to be moved along the axis of said tube by the last pushing member of said series, said force being transmitted from any rolling body to the next adjacent rolling body through the separating member between them, said force thus establishing rolling contact between the rolling bodies and the outer part of the curve of said section.

3. A device for the transmission of movement, comprising a stationary guide tube having a series of pushing members fitting movably in said guide tube, said tube having a curved section, the pushing members in said curved section comprising circular rolling bodies having substantially the same diameter as the inner diameter or corresponding dimension of the tube, a separating member being arranged between any two adjacent rolling bodies, said member being disc-shaped with a thickness in the axial direction of the tube, smaller than the diameter of the rolling bodies, said separating member having a concave curved surface at both sides, in which concavity the adjacent rolling bodies make contact therewith, a small bore being arranged between the bottoms of both concavities through the separating member, a driving member for applying a force along the axis of said tube to the first of the pushing members of said series, and a driven member arranged to be moved along the axis of said tube by the last pushing member of said series, said force being transmitted from any rolling body to the next adjacent rolling body through the separating member between them, said force thus establishing rolling contact between the rolling bodies and the outer part of the curve of said section.

4. A device for the transmission of movement, comprising a stationary guide tube having a series of pushing members fitting movably in said guide tube, said tube having a curved section, the pushing members in said curved section comprising circular rolling bodies, said bodies being divided into two groups with the bodies of one group alternating with the bodies of the other group along the length of said curved section, means causing the bodies of one group to be in rolling contact with one part of wall of said section but not with the opposite part of the wall and for causing the bodies of the other group to be in contact with the said opposite part of the curve but not with the said first one part, a driving member for applying a force along the axis of said tube to the first of the pushing members of said series, and a driven member arranged to be moved along the axis of said tube by the last pushing member of said series, the bodies of said one group rotating in one sense and the bodies in said other group rotating in the opposite sense, thereby establishing rolling contact between successive bodies.

5. A device for the transmission of movement, comprising a stationary guide tube having a series of pushing members fitting movably in said guide tube, said tube having a curved section, the pushing members in said curved section comprising circular rolling bodies, said bodies being divided into two groups with the bodies of one group alternating with the bodies of the other group along the length of said curved section, a zigzag-shaped cage with holes winding between the bodies of both groups and allowing mutual contact between the bodies of both groups through the holes causing the bodies of one group to be in rolling contact with one part of wall of said section but not with the opposite part of the wall and for causing the bodies of the other group to be in contact with the said opposite part of the curve but not with the said first one part, a driving member for applying a force along the axis of said tube to the first of the pushing members of said series, and a driven member arranged to be moved along the axis of said tube by the last pushing member of said series, the bodies of said one group rotating in one sense and the bodies in said other group rotating in the opposite sense, thereby establishing rolling contact between successive bodies.

6. A device for the transmission of movement, comprising a stationary guide tube having a series of pushing members fitting movably in said guide tube, said tube having a curved section, the pushing members in said curved section comprising balls, said balls being divided into two groups with the balls of one group alternating with the balls of the other group along the length of said curved section, the interior cross-section of the tube being in its center narrower than at some distance to both sides of said center and narrower than the diameter of the balls of both groups thus allowing mutual contact between the balls of both groups while maintaining the balls of one group to one side of said center and the balls of the other group to the opposite side of said center within the tube, a driving member for applying a force along the axis of said tube to the first of the pushing members of said series, and a driven member arranged to be moved along the axis of said tube by the last pushing member of said series, the balls of said one group rotating in one sense and the balls in said other group rotating in the opposite sense, thereby establishing rolling contact between successive balls.

References Cited in the file of this patent

UNITED STATES PATENTS

| | | |
|---|---|---|
| 2,002,709 | Niederhauser | May 28, 1935 |
| 2,298,011 | Hoffor | Oct. 6, 1942 |
| 2,384,742 | Hewitt | Sept. 11, 1945 |